US 6,601,153 B1

(12) United States Patent
Engelbrecht et al.

(10) Patent No.: US 6,601,153 B1
(45) Date of Patent: Jul. 29, 2003

(54) METHOD AND APPARATUS FOR INCREASING COMPUTER PERFORMANCE THROUGH ASYNCHRONOUS MEMORY BLOCK INITIALIZATION

(75) Inventors: Kenneth L. Engelbrecht, Blaine, MN (US); Hans C. Mikkelsen, Afton, MN (US); Wayne D. Ward, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/476,022

(22) Filed: Dec. 31, 1999

(51) Int. Cl.[7] ............................ G06F 9/312; G06F 13/16
(52) U.S. Cl. .................. 711/166; 707/200; 707/206; 709/102
(58) Field of Search ............................. 707/200, 206; 709/100, 102, 103; 712/219; 711/103, 165, 166

(56) References Cited

U.S. PATENT DOCUMENTS 5,218,698 A * 6/1993 Mandl ........................ 711/165
5,479,633 A * 12/1995 Wells et al. ................. 711/103
5,680,640 A * 10/1997 Ofek et al. .................. 709/100
5,687,368 A * 11/1997 Nilsen ........................ 707/103
5,802,344 A * 9/1998 Menon et al. ............... 711/165

OTHER PUBLICATIONS

Microsoft Press Computer Dictionary, 2nd ed. Doyle, editor. Microsoft Press, 1994. p. 240.*

* cited by examiner

Primary Examiner—B. James Peikari
(74) Attorney, Agent, or Firm—Charles A. Johnson; Mark T. Starr; Crawford Maunu, PLLC

(57) ABSTRACT

A system and method for increasing processing performance in a computer system by asynchronously performing system activities that do not conflict with normal instruction processing, during inactive memory access periods. The computer system includes at least one instruction processor to process instructions of an instruction stream, and a memory to store data. One or more inactive data blocks in the memory are identified, and a list of addresses corresponding to the identified inactive data blocks is generated. Available computing cycles occurring during processing in the computer system are identified, such as processing stalls and idle memory write periods. The inactive data blocks associated with the list of addresses are initialized to a predetermined state, during the available computing cycles. Addresses corresponding to those initialized data blocks are then made available to the computing system to facilitate use of the data blocks.

37 Claims, 6 Drawing Sheets

METHOD AND APPARATUS FOR INCREASING COMPUTER PERFORMANCE THROUGH ASYNCHRONOUS MEMORY BLOCK INITIALIZATION

FIELD OF THE INVENTION

This invention relates generally to increasing computer performance, and more particularly to a method and apparatus for exploiting underutilized or stalled execution cycles in the normal instruction stream by performing memory block initialization during processing stalls or idle memory write periods.

BACKGROUND OF THE INVENTION

Increasing computing speed and efficiency is a continual and tireless effort. The increasing complexity of application programs, greater need for networking capabilities, and the advent of the worldwide web are but a few computing categories begging for faster processing rates. As is known, there is a practical limit at any implementation to raw clock speeds, and innovative processing arrangements and methodologies often prove to be the key to unlocking further processing speed bottlenecks.

In order to increase processing speeds, many useful processing arrangements and methods have been devised. Multiprocessing, multitasking, pipelining, data bursting and many other technological advances have allowed processing speeds to increase. Despite these advances, certain conditions within the computing system can cause significant delays or otherwise waste valuable processing time. For example, during instruction execution by a processor, the processor encounters periods when it is not accomplishing useful work. This can occur for a variety of reasons, including data dependencies, memory latencies, changes in program flow, etc. The exploitation of these idle periods can significantly increase computing speed and data throughput.

Out-of-order instruction execution is one prior art manner of exploiting idle processor times and consequently increasing the ratio of working/idle processor time. Out-of-order instruction execution is very complex, however, and the complexity increases as the number of asynchronous events that must be recovered increases. Furthermore, processing "stalls", wasted instruction execution, and idle memory write periods can still occur in such an environment.

Running multiple instruction streams is another manner that attempts to take advantage of processing stalls. While some hardware may be shared, this solution may still require additional resources. The complexity is increased due to the need to coordinate the multitasking environment to properly utilize processing stalls, thereby increasing complexity and cost of the system. Further, these methods do not take advantage of available resources other than processing stalls in the instruction stream.

Therefore, it would be desirable to provide a system and method for increasing overall processing speeds by making use of periods of inactivity, without introducing the complexities and unpredictable results associated with other methods, such as out-of-order instruction execution or pure software methods. The present invention provides a solution to this problem by exploiting underutilized processor execution cycles and idle memory write cycles, and asynchronously performing certain activities in the background. The present invention therefore provides a solution to the aforementioned and other problems, and offers other advantages over the prior art.

SUMMARY OF THE INVENTION

The present invention relates to a system and method for increasing processing performance by asynchronously performing system activities that do not conflict with normal instruction processing, during inactive memory access periods.

In accordance with one embodiment of the invention, a method is provided for increasing processing performance in a computer system. The computer system includes at least one instruction processor to process instructions of an instruction stream, and a memory to store data. One or more inactive data blocks in the memory are identified, and a list of addresses corresponding to the identified inactive data blocks is generated. Available computing cycles occurring during processing in the computer system are identified, and the inactive data blocks associated with the list of addresses are initialized to a predetermined state, during the available computing cycles.

In accordance with another embodiment of the invention, a method for increasing processing performance in a computer system is provided. The computing system includes at least one instruction processor to process instructions of an instruction stream, and a memory to store data. One or more inactive data pages in the memory are identified, and a first list of first addresses corresponding to the identified inactive data pages are stored in a first linked list. Idle memory write cycles associated with a data write interface between the instruction processor and the memory are identified. The inactive data pages associated with the list of addresses are cleared to a predetermined state during the identified idle memory write cycles. The instruction processor initiates this clearing function via the data write interface, and this activity is independent of activity in the instruction stream. A second list of second addresses corresponding to the inactive data pages that have been cleared is stored in a second linked list.

In accordance with another embodiment of the invention, a system for asynchronously initializing inactive data blocks in a computing system is provided. A memory stores instructions and data associated with an instruction stream, where the memory includes inactive data blocks currently unused by the computing system. These inactive data blocks have residual data that is to be cleared before further use. A first queue stores addresses corresponding to the inactive data blocks, and a second queue stores addresses corresponding to the inactive data blocks that have been initialized. At least one instruction processor is provided to process the instruction stream, where the instruction processor includes a write interface coupled to the memory to allow data to be written to the memory. The instruction processor accepts the addresses from the first queue, initializes the corresponding inactive data blocks via the write interface during idle memory write cycles between the instruction processor and the memory, and stores the addresses corresponding to the inactive data blocks that have been initialized onto the second queue.

Another embodiment of the invention provides a system for asynchronously initializing inactive data blocks in a computing system. The system includes a memory for storing instructions and data associated with an instruction stream, where the memory includes inactive data blocks currently unused by the computing system. The memory also includes a first linked list to store addresses corresponding to the inactive data blocks, and a second linked list to store addresses corresponding to the inactive data blocks that have been initialized. At least one instruction processor is provided to process the instruction stream, and includes a write interface coupled to the memory to allow data to be written to the memory. The instruction processor is configured and arranged to accept the addresses from the first linked list, initialize the corresponding inactive data blocks via the write interface during idle memory write cycles between the instruction processor and the memory, and to store the addresses corresponding to the inactive data blocks that have been initialized onto the second linked list.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

Figure 1:
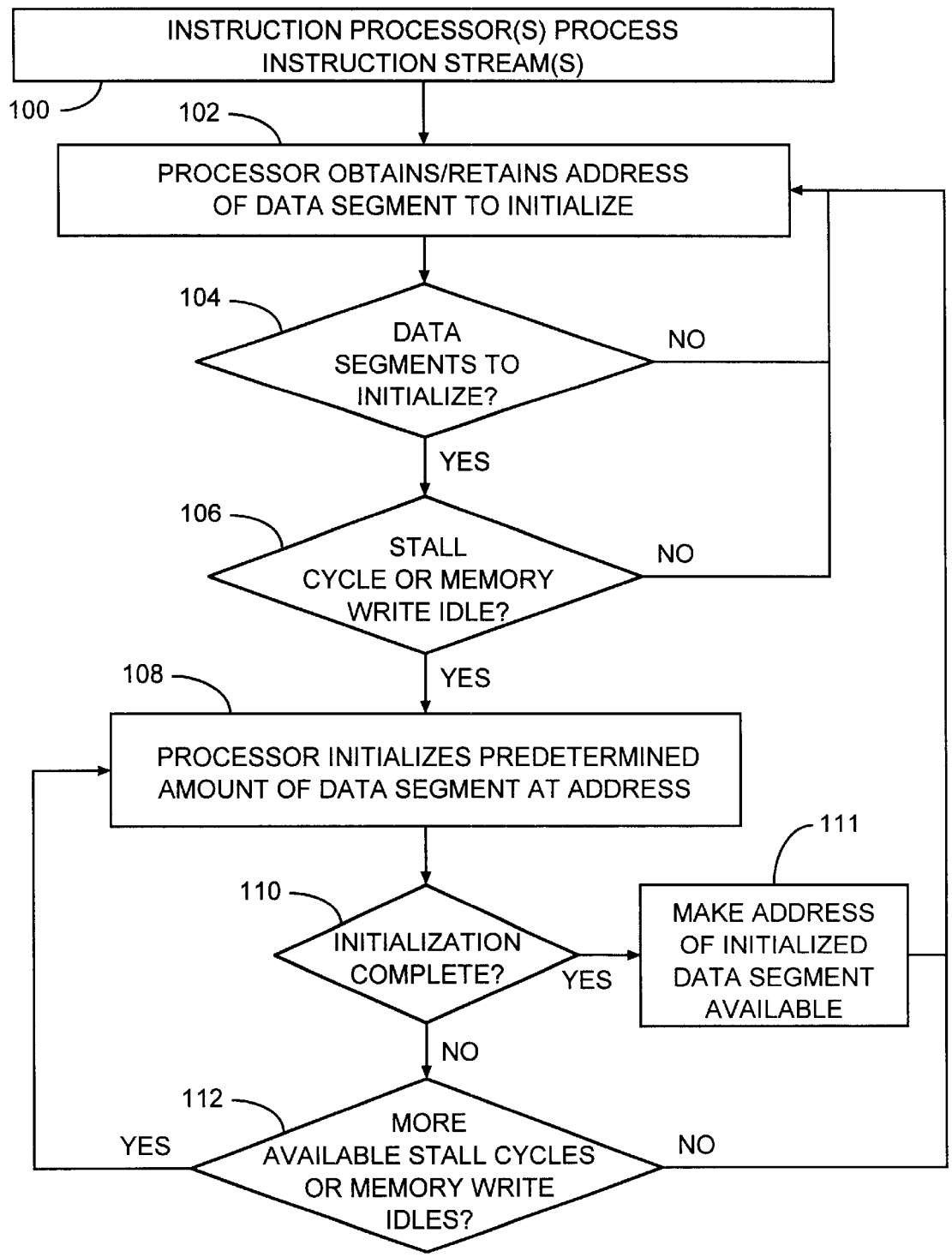
FIG. 1 is a flow diagram illustrating one embodiment of a process for initializing (e.g., "zeroing") pages or other data segments during processing stall cycles or idle memory write periods.

DETAILED DESCRIPTION OF THE
ILLUSTRATED EMBODIMENTS

Generally, the present invention provides a system and method for increasing processing performance by asynchronously performing system activities that do not conflict with normal instruction processing, during inactive memory access periods. One particular non-conflicting system activity is the required activity of initialization or "zeroing" residual blocks of data in a system employing virtual memory. The present invention provides the hardware with functionality to perform such non-conflicting activities asynchronously with respect to the normal instruction stream. In one embodiment of the invention, these activities are asynchronously performed during periods in which memory write functions associated with the normal instruction stream are idle. This exploitation of memory write idle times allows certain activities to be performed as background operations, without the complexities and potential conflicts associated with manipulation of the instruction stream itself.

The present invention may be used in connection with a processor or multiple processors in a computing environment having a memory, including a single processor system having a single instruction stream, a multi-tasking system, a multiprocessing system having multiple processors, a pipelined processing system where instructions are executed in instruction segments along an instruction pipeline, and the like. This may be used in the context of systems employing data migration from main memory to cache, memory paging, and other systems where residual data may need to be reset to a null, zero or other initialized value. Thus, while the present invention is particularly advantageous in the context of multiprocessing, pipelined computer systems, the present invention is not limited thereto and is equally applicable in other computing environments requiring memory initialization or zeroing. The present invention is thus not limited to the particular computing environments and embodiments described in the following figures, as will be readily appreciated by those skilled in the art from the description provided herein.

In a computing environment, the quantity of memory available is essentially a fixed quantity, whatever the selected quantity happens to be. It may arise, however, where a certain program requires more memory than the system has installed. One solution to this problem is to increase the amount of memory to accommodate the additional memory requirements. Another solution known in the art, often applied where the additional memory requirements are only occasionally required, is to use virtual memory. A virtual memory system is one that has a fixed amount of memory, but appears to the program as if it has more. In such a system, some portion of the code and/or data is kept in the main memory, and the remaining portion is kept in secondary, usually slower storage. The goal is to keep the code and/or data that is current in the main memory, and to keep the code/data that is not immediately needed in the secondary storage. As long as the program attempts to access code/data that is currently resident in the main memory, the code/data will be provided from the main memory. However, the program will eventually try to access code/data that is not in the main memory, which generates a page fault. A page fault is thus an access to a page (block) of memory that is not currently mapped to physical memory. When a page fault occurs, the operating system either fetches the page from secondary storage if the access was legitimate, or otherwise reports the access as illegal. The fetch from secondary storage is typically handled by a page fault interrupt-handling routine.

Similarly, systems employing cache memories also provide information in blocks. Data stored in cache memory is more quickly accessible than data stored in a main memory area such as RAM. When, for example, a read function for a particular data segment is attempted, the cache (or multiple caches in the case of multi-level caching) is inspected first to determine whether the requested data is in the cache. If so, it is a "hit", and the data is read from the cache. If the data is not in the cache, it is a "miss", and the data must be retrieved from RAM. However, data is not retrieved piece-by-piece from the RAM, but rather is typically retrieved in "cache lines" or "cache blocks". Generally, a cache line is the smallest unit of memory that is transferred between the main memory and the cache. Each cache line or block includes a certain number of bytes or words, and a whole cache line is read and cached at once. This takes advantage of the principle of locality of reference, which stands for the proposition that if one location is read, then nearby locations (particularly following locations) are likely to be read soon thereafter. It can also take advantage of page-mode DRAM, which allows faster access to consecutive locations.

Other similar data block transfer methodologies exist. In each of these cases, memory pages, cache lines and the like at some point are no longer in current use. For example, a memory page may be "paged out" or cache line may be "aged out". However, the information associated with those pages, cache lines or other data segments is still present. This is undesirable in certain situations, such as in multi-user computing environments, as residual data in a page, cache line or other data segment is susceptible to access by a different user of the system. These pages and cache lines belong to the system, and the system can assign an available page to any user at any instant in time, depending on how the system has been mapped by the operating system. If a first program needs a page, a page is provided to that program, which in turn reads/write it, and when the program has completed its operation on that page, the page again becomes available. If another program used by somebody else now needs a page, the page used by the previous program is still available and could be assigned to and accessed by the current program. This can pose security problems, particularly where the page or cache line includes personal data, such as credit card information. Therefore, it is generally desirable to initialize or clear the residual data from such pages or cache lines before they are used again. This may be referred to as "zeroing" pages (or other data segments). Furthermore, by zeroing pages, data transfer time may be reduced where data is being loaded if the system knows that a certain page of the data transfer has been cleared, because the system will know that the page has been zeroed and the zeroed content does not have to be transferred. For these and other reasons, page zeroing plays an important role in data processing.

Currently, pages are zeroed exclusively via software. Software must initialize pages before passing the page to a new user to prevent the new user's visibility to data from the previous user of the same physical page. This is accomplished by issuing instructions to store the initialization value into all of the words of the page. When a program is about to provide a page to one of its activities, it takes an available page that has residual data therein. The software must then zero the entire page, by issuing instructions, before passing the page over to the requesting activity. This is very time-consuming and requires many write cycle instructions that suspend more productive processing activities. Software can initialize some pages during periods when there are no user programs to execute (e.g., each thread is blocked waiting for a particular condition, or there are no threads to execute). However, during periods of high activity, there may be no unused program time available to initialize pages, and software may exhaust the supply of previously-initialized pages. In these cases, the software must stall program execution in order to initialize pages before re-using them.

The problem of software zeroing is exacerbated as the size of memories and the associated addressibility increases, because page sizes tend to increase proportionally. As page sizes increase, strict software page zeroing results in a proportionally larger consumption of time to zero pages each time a page fault occurs. It would be much more efficient to zero such pages during idle times, rather than to consume valuable processing cycles. The present invention provides a manner of minimizing the loss of productive processing cycles to page zeroing.

When an instruction processor is executing an instruction stream, whether pipelined or not, there are times that the processor attempts to access data that is not in its local cache. In the case of a cache miss, processing stalls for a few clock cycles while the data is loaded from the main memory into the local cache. These types of processing "stalls" can occur for cache read and write functions, and for instructions and data. Other activities within the computing system can also cause processing idle periods, such as data dependencies, changes in program flow, etc. Further, even when there are no idle processor cycles such that the processor is continuously executing instructions and there is no stall in the instruction stream, the write bandwidth to memory may not be fully utilized, resulting in a number of write cycle idle periods. The present invention takes advantage of these processing stalls and write cycle idles to perform the previously-identified zeroing function at the opportune times.

FIG. 1 is a flow diagram illustrating one embodiment of a process for initializing (e.g., "zeroing") pages or other data segments during processing stall cycles or idle memory write periods. One or more instruction processors in a computing system are designed to process a series of instructions, as shown at operation 100. In accordance with the invention, data segments are zeroed concurrently with processing of the instruction stream. For example, in the case of processing stall cycles in the instruction stream, a page or a portion of a page is zeroed during processing stall cycles. Similarly, in the case of memory write idle periods, a page or a portion of a page is zeroed when the processor is not using a memory write interface. Therefore, while operation 100 is depicted as a serial operation in the flow diagram of FIG. 1, this is for illustrative purposes, as the instruction stream is generally processed concurrently with operations of the present invention.

At operation 102, the processor obtains an address of a data segment to initialize. As described more fully below, the processor may take the initiative of obtaining the address on its own, or the address may be provided to the processor. In other instances, the processor may have already been provided with an address of the data segment to initialize, in which case the processor retains the address, e.g., within an internal register or first level cache of the instruction processor. This may be the case where the processor had started to initialize a data segment but had not completed the task. Other manners of notifying the processor of a data segment to initialize may also be used in connection with the invention. The data segment may represent a page, cache line, or other predetermined number of bytes/words.

At decision operation 104, it is determined whether there are any data segments to initialize. If there are no data segments to initialize, the processor may again attempt to obtain an address of a data segment to initialize 102. If the processor obtained an address either by obtaining an address itself or by receiving the address from another entity, it is determined 106 whether a processing stall has occurred, or whether there is an idle period associated with a memory write port, bus, etc. to memory. If not, the processor retains the address of the data segment to initialize 102, and it is again determined 106 whether a processing stall or memory write idle has occurred. If and when there is such a processing stall or memory write idle, the processor initializes a predetermined amount of the data segment identified by the address as seen at operation 108. The predetermined amount may be the entire page/cache line, or may be a subset thereof. If the initialization of that page, cache line, etc. has been completed as determined at decision operation 110, the address of that initialized data segment is made available to the system as seen at operation 111. In one embodiment, the address of the initialized data segment is made available by adding the address to a queue, linked list, or other data structure from which the address may be subsequently obtained. If the initialization has not completed, it may be determined 112 whether there are still more available stall cycles or memory write idles, and if so, the processor may continue to initialize 108 the data segment. Alternatively, the processor may initialize the data segment or a subset thereof, and upon completion of that initialization the address of the initialized data segment is made available at operation 111.

As indicated above, instruction processing of the instruction stream by the processor is not modified or delayed by any of the operations in FIG. 1. The invention makes use of "stalled" cycles in the instruction stream which does not affect normal processing of the instruction stream. In the event of a memory write idle, the initialization of data segments occurs in parallel with instruction processing, and therefore does not affect normal processing of the instruction stream. This is described in greater detail below.

Figure 2:
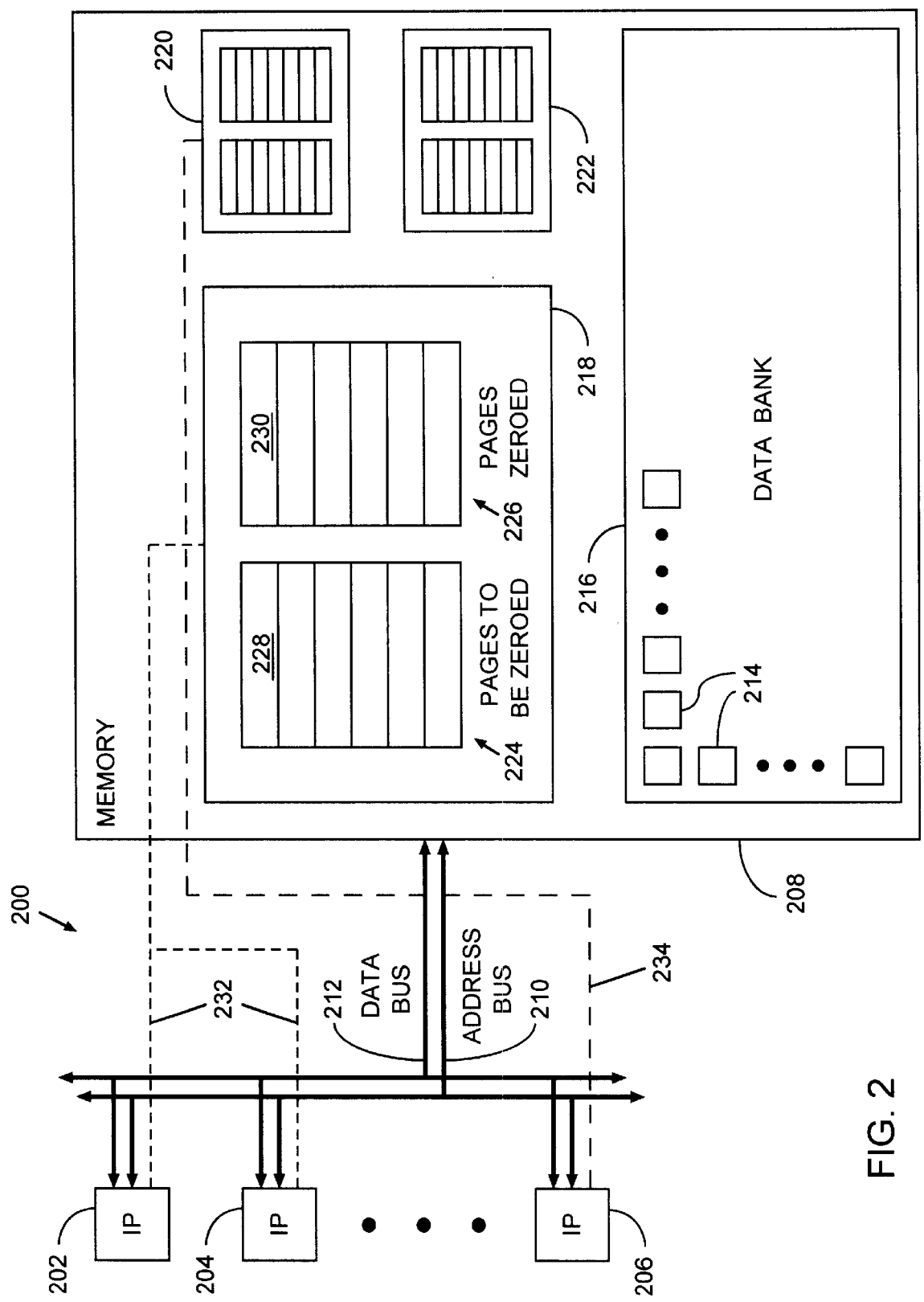
FIG. 2 is a block diagram of an example data processing system incorporating the principles of the present invention.

FIG. 2 is a block diagram of an example data processing system 200 incorporating the principles of the present invention. In the example configuration of FIG. 2, a plurality of instruction processors (IP) are shown, including IP 202, IP 204, through the n-th IP 206. Each of the IPs is capable of executing instructions of one or more computer programs. Each IP may execute instructions in a single instruction stream, or may perform pipelined execution of the instructions. In one embodiment of the invention, the IPs 202, 204, 206 implement instruction pipelining.

Generally, pipelining of instruction execution is a method of improving system performance by increasing the speed at which instructions are executed. Each functional operation that is to be performed during execution of the instruction is divided into a separate execution stage. For example, a standard instruction may require four stages to execute, including decoding the instruction, fetching operands, executing the instruction, and storing the results. Often executing and storing of results are considered a single stage. Pipelining instructions takes advantage of the fact that these functional operations take place within different areas of the instruction processor, which allows instructions to overlap during execution. In this manner, each functional stage/area of the pipeline can be processing a different instruction at the same time. Once the pipeline is filled, one machine instruction generally completes execution every pipeline stage.

Each IP 202, 204, 206 addresses the memory 208 via the address bus 210, and reads/writes data via the data bus 212. During normal instruction processing, the IPs issue addresses over the address bus 210, and read data from the memory 208 via data bus 212 when the instruction comprises a data read command, and write data to the memory 208 via the data bus 212 when the instruction comprises a data write command. Alternatively, separate buses may be used for reading and writing data. Further, the memory 208 may represent RAM, but in one embodiment of the invention the memory 208 represents a second level cache situated between the IPs and a main storage unit.

Whether the IPs execute a single instruction stream, multiple instruction streams, or incorporate pipelined instruction execution, there are times when the instruction stream experiences cycles of inactivity. This may be due to memory latencies, data dependencies, and the like. Furthermore, even when the processor is busy executing instructions, the write bandwidth to memory may not be fully utilized. Whenever there is such a stall in the instruction stream (i.e., processing of the instruction stream is temporarily suspended until the event causing the inactivity has completed), or such an underutilization of the write bandwidth to memory, valuable processing cycles may be wasted.

The present invention utilizes these inactive periods by initializing pages 214 in the data bank 216. This relieves the system from having to initialize these pages via the normal instruction stream, thereby increasing processing efficiency.

In one embodiment of the invention, the memory includes one or more data structure pairs, such as data structure pairs 218, 220 through an n-th data structure pair 222. The data structures within each pair in the present example are linked lists. A linked list is a data structure consisting of a sequence of data elements, in which each element contains a pointer to the next element, thereby forming a linear list. Linked lists are dynamic in that they can increase or reduce in size depending on the number of elements in the list. It should be recognized, however, that other data structures may be used, such as queues, stacks, etc. It is also possible to implement queues and linked lists that are hardware devices separate from the memory 208.

In the embodiment of FIG. 2, a first data structure 224 in each structure pair is a linked list of pages to be zeroed (hereinafter referred to as "to-be-zeroed queue" for ease of discussion), and a second data structure 226 is a linked list of pages that have been zeroed (hereinafter referred to as "zeroed queue"). In this example the concept of a "page" is used for purposes of discussion, but it should be recognized that other data segments can likewise be used, such as cache lines or any other predetermined data block. Further, "zeroing" is used to represent one embodiment of initializing the pages, which in this embodiment is to initialize the pages to a logical state of zero.

The to-be-zeroed queue 224 and the zeroed queue 226 in each data structure pair 218, 220, 222 includes one or more entries 228, 230 respectively. Each entry represents an address of a data segment in the data bank 208, such as the address of the start of a page 214. An entry on the to-be-zeroed queue 224 is an indication that the data segment corresponding to address needs to be zeroed. Where there are no data segments to be zeroed, there will be no entries on the to-be-zeroed queue 224. An entry on the zeroed queue 226 is an indication that the data segment corresponding to the address has been zeroed. When no data segments have been zeroed, there will be no entries on the zeroed queue 226.

When a processing stall or write idle time occurs with respect to a particular IP, it recognizes this stall or write idle time and gets an address of a page to be cleared from the to-be-zeroed queue 224. If the IP is able to clear the entire data segment (e.g., page) during the stall or write idle time, it enters the address of the newly-cleared (e.g., zeroed) page on the zeroed page queue 226. Pages on the zeroed page queue 226 are then available for the system to use, and the software will look to the zeroed page queue 226 when it needs a new page.

There may be only one data structure pair 218 that provides the to-be-zeroed queue for all IPs 202, 204, 206 in the system 200. Alternatively, one or more IPs, such as IP 202 and IP 204, can be initialized to reference data structure pair 218, as represented by dashed line 232, while other IPs such as IP 206 can be initialized to reference a data structure pair such as data structure pair 220, as represented by dashed line 234. In one embodiment of the invention, all IPs 202, 204, 206 reference a single data structure pair, such that all IPs obtain addresses of pages to be zeroed from queue 224 and store zeroed page addresses on queue 226.

Each IP is informed of which queues 224, 226 it will use. In one embodiment, this is accomplished via an operating system initialization command that initializes each processor with information as to where to find its corresponding queues 224, 226. Therefore an instruction is executed, at initialization time or a convenient time thereafter, that informs each processor where its controlling information resides so that each processor knows where to get addresses to pages to be zeroed, and where to place the addresses of pages it has cleared. This is a controllable feature, and each IP can be associated with a common queue pair or different queue pairs.

In one embodiment, the instruction executed to inform the processors of the location of its associated queue pair inserts address information of the queues to which it will be associated. For example, two registers can be used, one to inform the IP of the location of its to-be-zeroed queue 224, and one to inform it of the location of its zeroed queue 226. A third register can be used to hold the address of the item from the queues, and its value changes as addresses are removed and entered onto the queues 224, 226. A single register could also be used to provide a base address, and address offsets can be calculated or stored elsewhere. Alternative manners of maintaining the queue 224, 226 addresses at each IP are also feasible, and the particular manner chosen is dependent on user preference.

This instruction also places the instruction processor in a state such that when it recognizes a stall or write idle time, it automatically references its internal register holding the to-be-zeroed address, and begins zeroing the corresponding page. If there are no entries in the to-be-zeroed queue 224, no page zeroing takes place.

Because clearing a page may take many write cycles, it is unlikely that a processing stall or write idle will be lengthy enough to allow the entire page to be cleared at once. In one embodiment of the invention, the entire page will not be cleared where the stall or write idle time is shorter than that required to clear the entire page, so that normal processing of the instruction stream is not delayed. Therefore, the processor may perform the page clear function piece-by-piece until the entire page is cleared, which may span many write cycle idle periods or processor stalls. In this case, the processor preferably stores the current address within the page at which the processor left off in the zeroing process, and upon recognition of the next stall or write cycle idle, the processor picks up where it left off as indicated by the stored current address. While the processor may be forced to encounter many stalls or write cycle idles in order to complete zeroing of a single page, it is performed at times when processing resources are otherwise underutilized. System performance is therefore increased regardless of whether the processor is able to complete the task in one attempt or many attempts. Alternatively, the processor can be configured to clear no less than a predetermined portion of a page, such as a cache line at a time. When the processor reaches the address associated with the last byte/word of the page, the processor will enter the address of the zeroed page on the zeroed queue 226 for subsequent use by the system 200.

In another embodiment of the invention, a special memory bus function may be used in connection with the zeroing process. This function may be used to allow the processor to store zeroes (or other predefined initialization value) into an entire cache line at a time. In this manner, fewer instructions need be supplanted in the instruction stream. An example of such an embodiment is provided in connection with FIG. 5.

Figure 3:
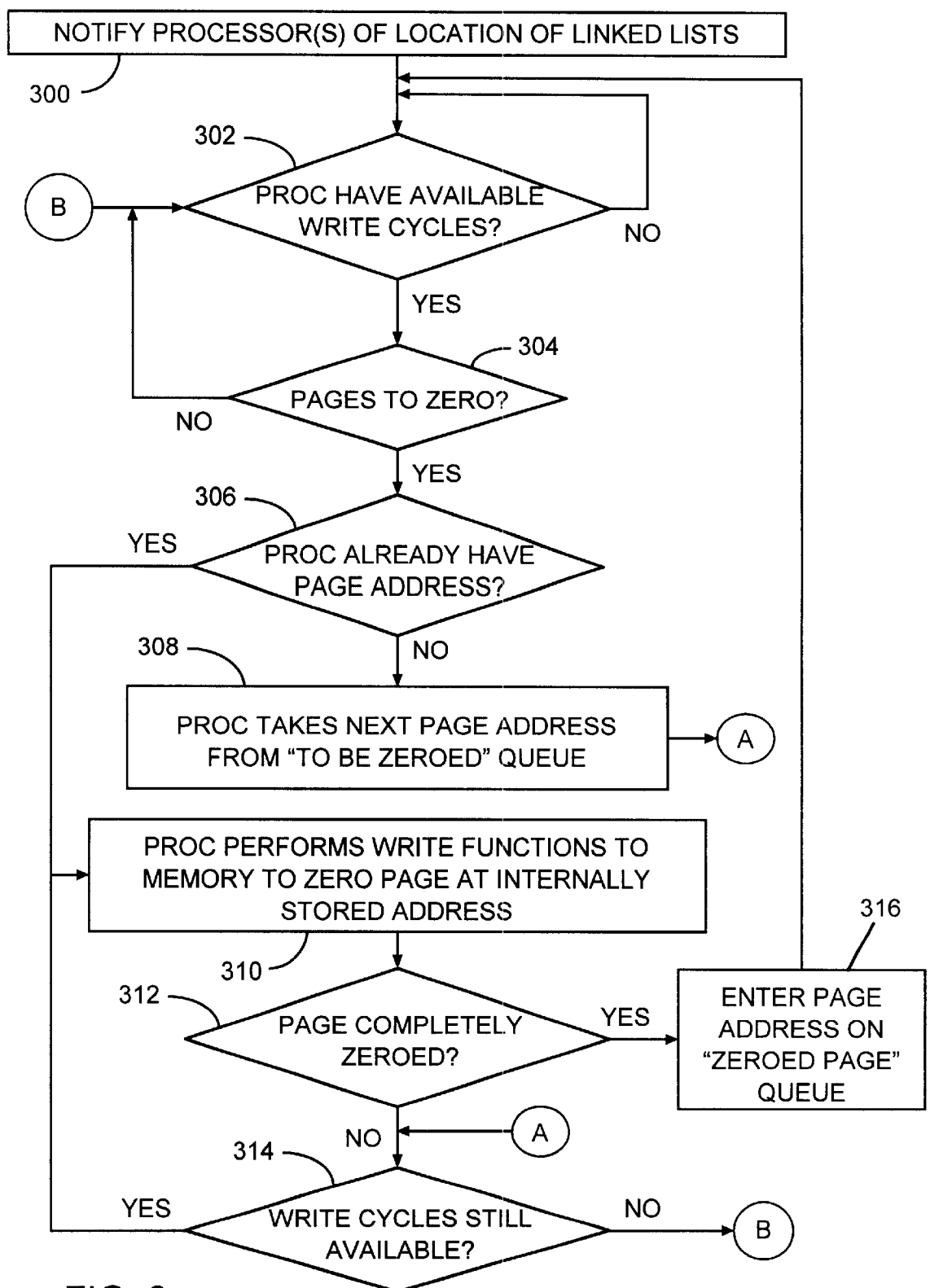
FIG. 3 is a flow diagram illustrating one embodiment of a method for zeroing pages during processing stalls or write cycle idles, in accordance with the principles of the present invention.

FIG. 3 is a flow diagram illustrating one embodiment of a method for zeroing pages during processing stalls or write cycle idles, in accordance with the principles of the present invention. The processor(s) are notified 300 of the location of the linked list or queue. In one embodiment, the notification is effected by a command executed at the time of system initialization to provide each processor with locations of its respective to-be-zeroed queue 224 and zeroed queue 226.

If the processor does not have available write cycles processing stall cycles as determined at decision operation 302, the system waits until such cycles are identified as indicated by the NO return path. When the processor has available write or stall cycles, it is determined at operation 304 whether there are any pages to zero. In this embodiment, this can be determined when the processor looks to its addressed to-be-zeroed queue 224. If there are no entries on the queue 224, no pages will be zeroed by that processor at that time. If entries exist on the to-be-zeroed queue 224, it may be determined at operation 306 whether or not the processor already has a page address stored in its register. This operation may alternatively be performed prior to determining whether there are pages to be zeroed. Where the processor already has a page address stored in its register, it indicates that the processor is in the process of zeroing a page, but was unable to complete the entire page zeroing in a given stall or write idle time period. In this case, the processor stores the current address within the page where the processor left off in the zeroing process, and upon recognition of the next stall or write cycle idle, the processor picks up where it left off as indicated by the stored current address. Operation 306 determines whether or not the processor is already working on a particular page. This can be determined, for example, by analyzing the contents of an internal processor register, and if an address is present in that internal register, it is known that the processor is already working on a particular page. The number of pages being held in processors for zeroing pages is small, so system performance does not suffer. For example, a processor may hold one, or a few page addresses each.

If the processor does not already have a page address stored in a register, the processor takes the next page address from the to-be-zeroed queue 224 as seen as operation 308. The page associated with that start address is the page that the processor will operate on until the page is successfully and fully cleared. This start address is preferably stored in an internal working register of the processor, such as the internal working register discussed in connection with operation 306. If the processor already has a page address stored as determined at decision operation 306, the processor performs write functions to memory in order to zero the page at the internally stored address. This is illustrated at operation 310.

Where the processor obtained the next page address from the to-be-zeroed queue as shown at operation 308, it is determined whether write cycles are still available at decision operation 314. If not, processing returns to decision operation 302 to monitor for available write or stall cycles. If write cycles are still available, the processor performs write functions to memory to zero the page at the internally stored address as seen at operation 310. Similarly, where the processor already has a page address stored in an internal register as determined at decision operation 306, the processor will perform write functions to memory to zero the page at that address as seen at operation 310. It is then determined whether the page has been completely zeroed at decision operation 312. If the page was successfully zeroed in its entirety, the address associated with the page is loaded into the zeroed page queue 226 for use by the system, as seen at operation 316. Processing then returns to decision operation 302 to monitor for available write or stall cycles. If the page has not been completely zeroed, it is determined 314 whether write cycles are still available. If not, processing returns to decision operation 302 to monitor for available write or stall cycles. If write cycles are still available, the processor performs write functions to memory to zero the page at the internally stored address as seen at operation 310.

As discussed above, the present invention is capable of zeroing pages during processing stalls or memory write idles. In one embodiment of the invention, the memory write idles represent a write interface between the processor and a cache. For example, the write interface may be the interface for writing data from the first level cache of an instruction processor to a second level cache in the system. The data write activity on this interface is not synchronized to the activity occurring with respect to the instruction stream or instruction pipeline. This write interface can be monitored rather than monitoring the instruction stream itself, which allows processing stalls to be disregarded because the page initialization methodology can be applied to times when the write interface between the processor and the second level cache is idle. Whenever this write interface is idle, work can be performed on that write interface—particularly, information can be sent via the write interface to initialize/zero pages associated with the memory or second level cache. In this manner, no additional resources are required, as all of the hardware used to exploit the memory write idles is already available in the system.

In accordance with the present invention, pages can be zeroed even when the processor is busy executing instructions and does not encounter a processing "stall." Instead, the write interface is monitored, and if write cycles are available despite the fully-active processor execution, the available write cycles are used.

To implement such a system, the processor may store the address of a page to be cleared in its internal registers. As addresses are sent out from the processor to write memory locations during memory write idles, the address may be incremented to the next address of the page. When the page has been zeroed, another address is provided to the processor.

In one embodiment of the invention, both a write interface and a read interface are present between the processor and the memory or second level cache. In this manner, even when the processor is executing instructions and reading information via the read bus, page zeroing can take place on the write bus. The processor can be equipped with a write port that holds one or more addresses, and when write idles occur, the addresses can be sent to the memory via the write port. Alternatively, if the data bus and address bus were shared, data could be written to the bus when the bus was inactive, even though the processor may be executing instructions on information stored in its internal registers. Further, as described herein, another embodiment a special memory bus function that informs the memory or second level cache that it, rather than the processor should take responsibility for zeroing the entire data segment.

Figure 4:
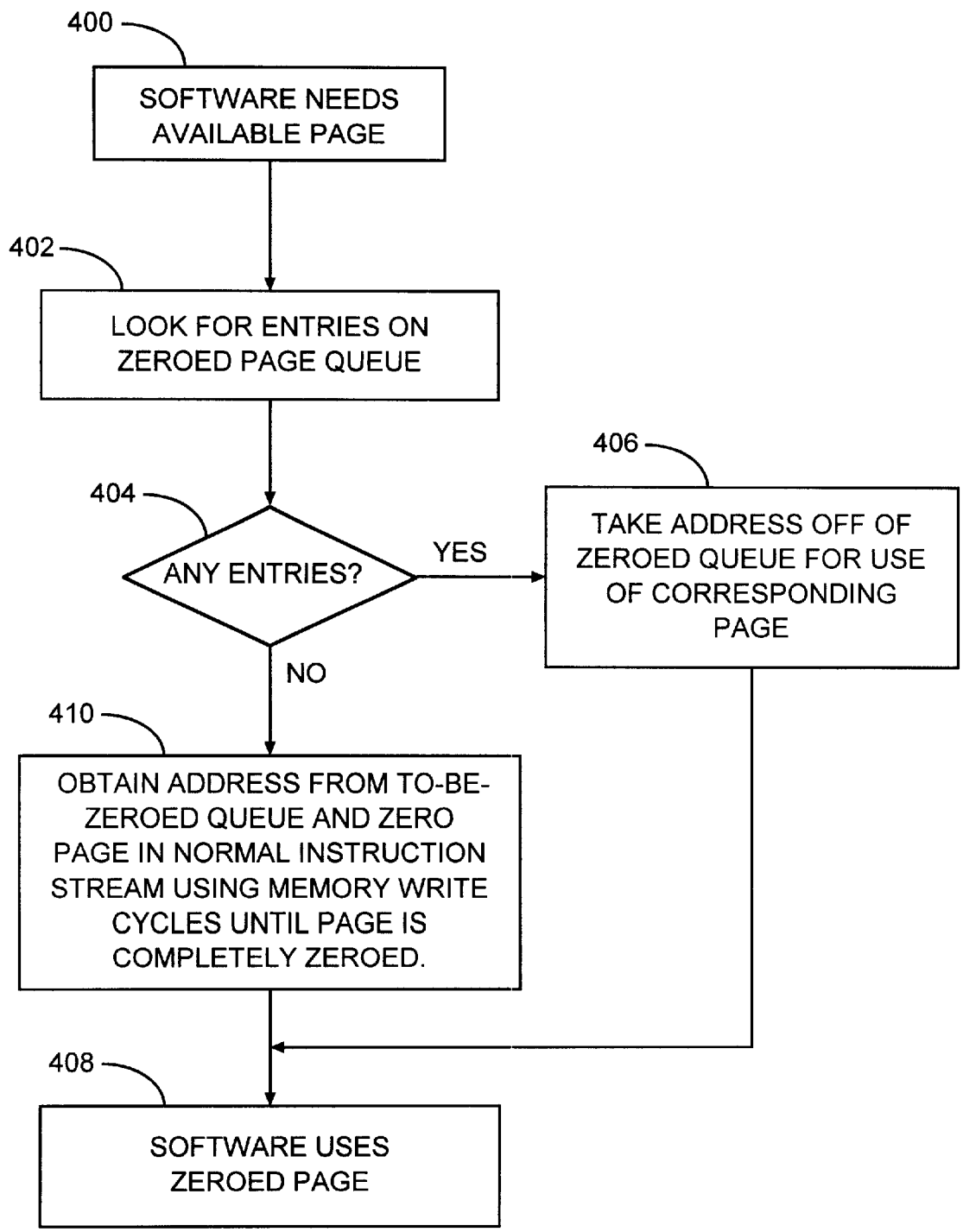
FIG. 4 is a flow diagram illustrating an embodiment of a process for using software zeroing to backup the zeroing of pages or other data segments during processing stall cycles or idle memory write periods.

FIG. 4 is a flow diagram illustrating another embodiment of a process for using software zeroing as backup protection. For software to perform page zeroing, each data segment in a page of memory must be cleared using standard write operations, which is time-consuming and suspends useful work until the page is cleared. This is because software clearing includes write instructions to memory, where the write instructions are simply part of the normal instruction stream. For example, a software subroutine may be executed when a page is needed, where the software subroutine is part of the normal instruction stream, and is executed in lieu of other instructions in the instruction stream. While software page zeroing is not desirable, one embodiment of the present invention utilizes software page zeroing as a backup, to allow software clearing where the processors have not been able to clear pages for system use.

Referring now to FIG. 4, operation 400 indicates that an available page is needed. A determination of when a page is needed is typically performed by the operating system software or memory management software. If pages are not currently needed, no further action is taken until pages are needed. When a page is needed, the requesting software looks to the zeroed queue (e.g., queue 226) for an entry (e.g., entry 230) identifying a page that has been zeroed, as seen at operation 402. If entries exist on the zeroed queue 226 as determined at decision operation 404, the address at the top of the queue or linked list is taken by the software so that the corresponding page may be used. This is generally illustrated at operation 406. At that point, the software may make use of the zeroed page as seen at operation 408.

If no entries exist on the zeroed queue 226 as determined at decision. operation 404, the software takes responsibility for zeroing the page as depicted at operation 410. Software executed by the instruction processor as part of the instruction stream looks to the to-be-zeroed queue 224 and obtains the address of a page that is available for zeroing. The software then directs the instruction processor(s) to zero that page by executing a series or loop of instructions that write the page to the predetermined state. Thus, where the IPs are unable to zero all of the pages required by the system, the software can perform this function. In this manner, page zeroing time removed from the normal instruction stream whenever possible, but page zeroing is guaranteed even if normal instruction stream is required.

As previously indicated, one embodiment of the invention makes use of a special memory bus function. This function may be in the form of a command from the processor to the memory to store zeroes (or other predefined initialization value) into an entire cache line or other predetermined block at a time.

Figure 5:
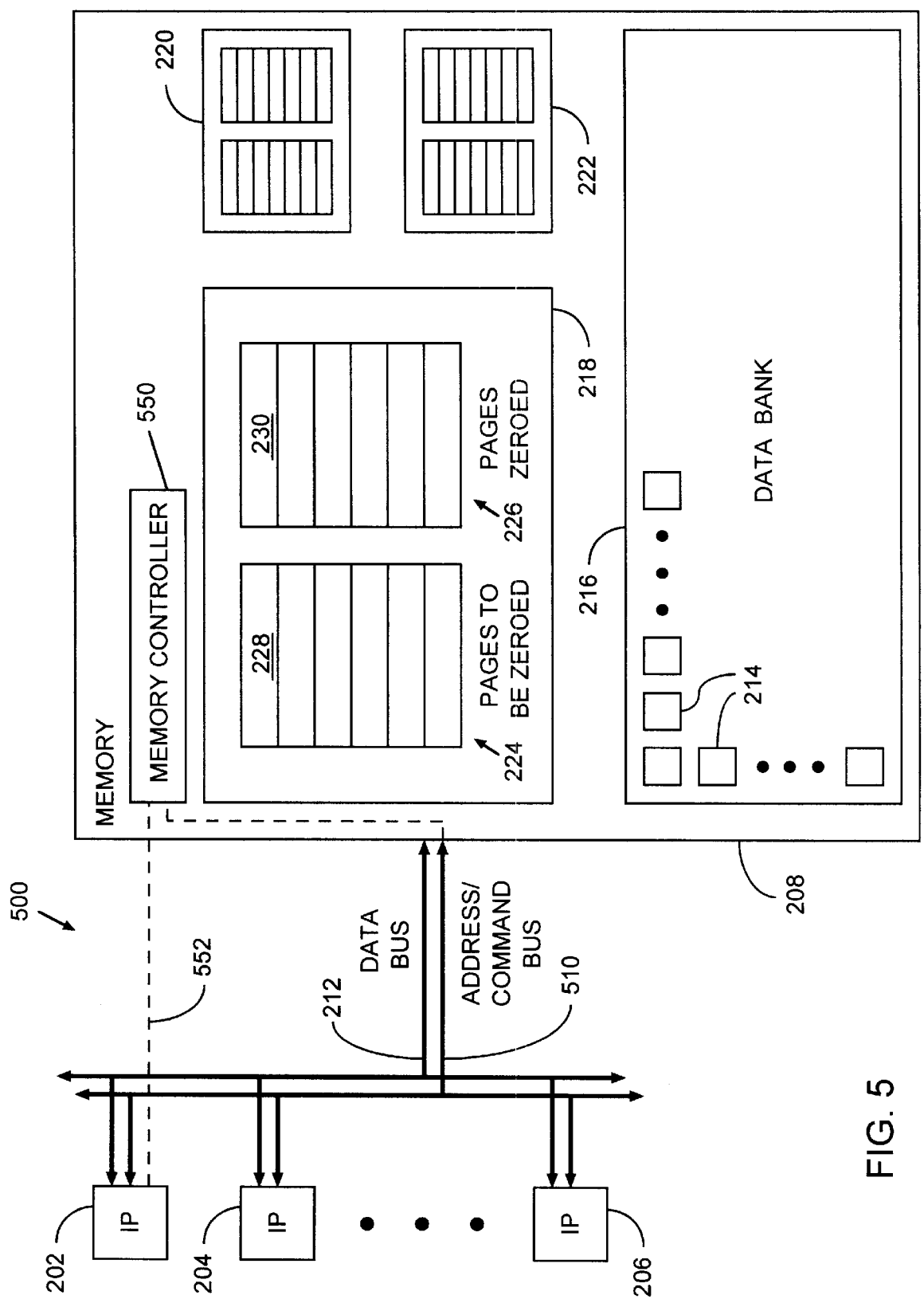
FIG. 5 is a block diagram of an example data processing system in accordance with the present invention, wherein a special bus function is used to zero pages.

FIG. 5 is a block diagram of an example data processing system 500 in accordance with the present invention, wherein a special bus function is used to zero pages. As was described in connection with FIG. 2, a plurality of instruction processors (IP) are shown, including IP 202, IP 204, through the n-th IP 206. Each IP 202, 204, 206 addresses the memory 208 via the address/command bus 510, and reads/writes data via the data bus 212. In this embodiment, a special command is provided with the address/command bus 510, which allows a larger block of data to be cleared at a time, such as a cache line.

For purposes of explanation and not of limitation, one example address/command bus 510 is described. An interface to memory 208 includes separate bi-directional data interconnections 212 and bi-directional address/command interconnections 510. This embodiment further includes control lines that control the operation on the data and address/command interconnections (not individually shown). The command information indicates the type of operation to be performed. Commands may direct operations such as a data fetch, data flush, data return, and other commands identifying the action desired. The control information may provide timing and bus arbitration signals used by distributed state machines to control the transfer of data and address/commands between the IPs and the memory. A memory controller 550 can receive and process the commands.

In the embodiment of FIG. 5, a special command to "initialize page" or "zero page" is transmitted to the memory 208 via the address/command bus 510. Associated with the command are address and data signals that that can provide the address of the page that is to be zeroed. The memory can then execute a special function to clear the predetermined data segment (e.g., a cache line) starting at the address provided. Alternatively, a separate hardware signal on line 552 can trigger the zeroing function at the address of the cache line or other data block to be zeroed.

Figure 6:
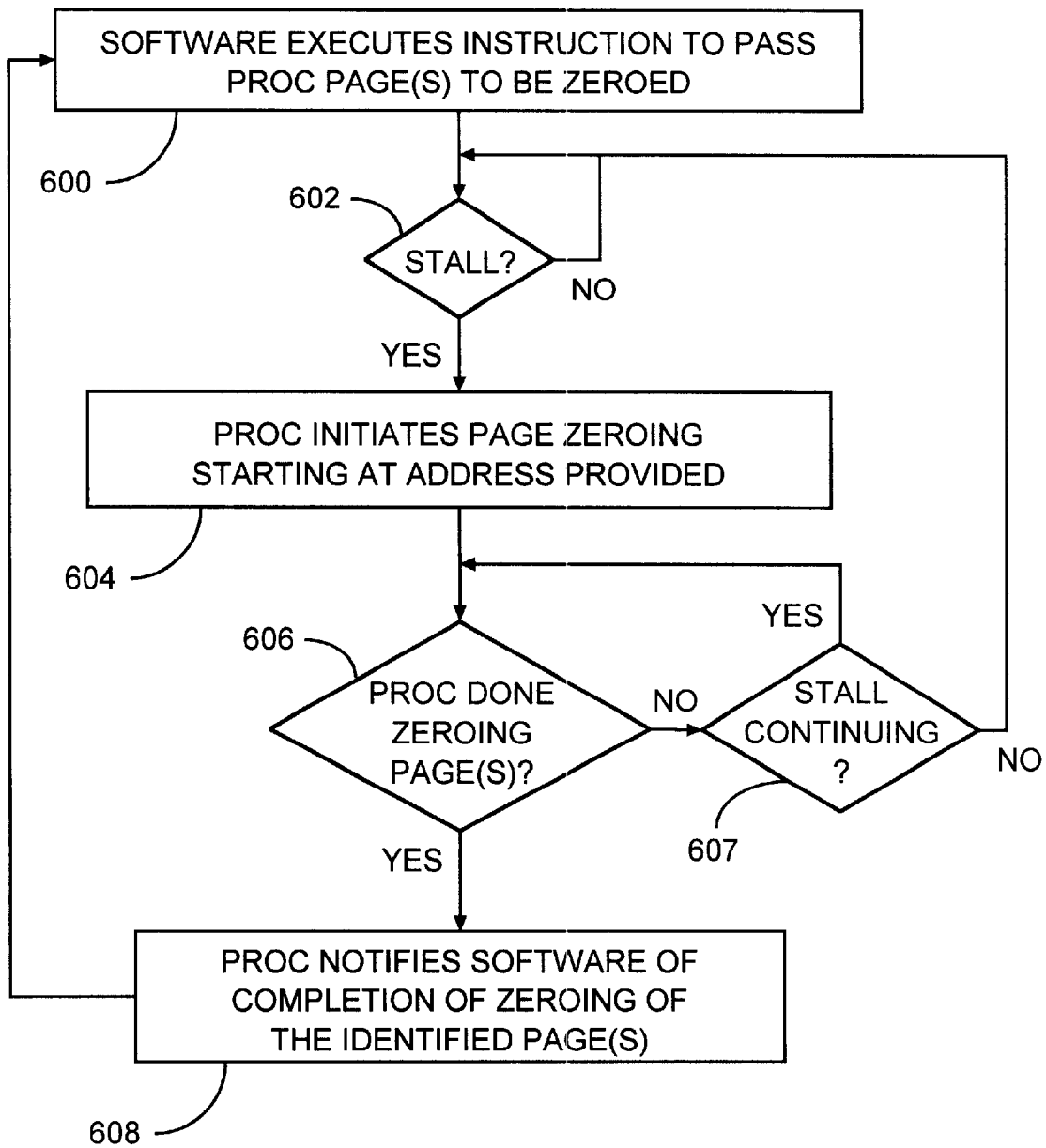
FIG. 6 is a flow diagram of an alternative manner of passing pages to be zeroed to and from the processor.

As was described in connection with FIG. 2, one embodiment of the invention allows the processor to take entries from the to-be-zeroed queue 224 and place zeroed blocks on the zeroed queue 226. However, in another embodiment of the invention, the processor is not aware of the shared linked lists of pages to be zeroed, nor is it aware of the linked list of pages already zeroed. FIG. 6 is a flow diagram of such an embodiment. Software directs the processor to pass the processor one data block (e.g., page), or a linked list of pages, to be zeroed as seen at operation 600. No further action is taken until there is a processing stall or write cycle idle, as seen as operation 602. Once a stall or write idle occurs, the processor initiates 604 the page zeroing starting at the address provided by software. This address may be stored in an internal register of the instruction processor until the stall or write idle occurs. When the processor has completed zeroing the page(s) as determined at decision operation 606, the processor notifies 608 the software of completion of the page zeroing task for the identified page(s). If the processor has not completed zeroing the page(s), the processor will attempt to zero the page(s) as long as the stall or write idle is still in effect as determined at decision operation 607. If the stall or write idle is still in effect, the processor continues zeroing the page(s). The process continues until the stall is no longer in effect as determined at operation 607, at which time page zeroing is suspended until a new stall occurs as determined at operation 602.

In one embodiment, the processor notification operation 608 includes the use of a specific interrupt issued by the processor to the software to acknowledge completion of the requested page zeroing task. A software polling routine can also be used to periodically poll the processor to determine when it has completed, however this method periodically requires instruction stream cycles. A particularly useful embodiment is to attach an indicator to an already-generated interrupt. In many computing systems, interrupts are generated often for a variety of reasons. For example, page fault interrupts occur to indicate that a cleared page is required. Interrupt handlers can be coded to cause one, many or all of the interrupts generated to access a common interrupt routine which allows the processor notification to be tag on to the interrupt. This removes the necessity to create a special interrupt, and avoids the undesirable addition of periodic polling instructions in the instruction stream.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for increasing processing performance in a computer system having at least one instruction processor to process instructions of an instruction stream, and having a memory to store data, the method comprising:

identifying one or more inactive data blocks in the memory;

generating a list of addresses corresponding to the identified inactive data blocks;

identifying available computing cycles during processing in the computer system; and initializing, via the at least one instruction processor that is used to process instructions of the instruction stream, the one or more inactive data blocks associated with the list of addresses to a predetermined state during one or more of the available computing cycles, wherein the initializing is performed asynchronously with respect to processing of the instruction stream by the at least one instruction processor.

2. The method of claim 1, wherein identifying available computing cycles comprises identifying available memory write cycles when a write interface to memory is idle.

3. The method of claim 2, wherein identifying available memory write cycles comprises determining when the write interface between a first level cache in the instruction processor and a second level cache in the computer system is temporarily idle.

4. The method of claim 2, wherein identifying available memory write cycles comprises identifying available entries in a memory write buffer.

5. The method of claim 1, wherein identifying available computing cycles comprises identifying temporary suspensions of instruction stream processing.

6. The method of claim 5, wherein identifying temporary suspensions of instruction stream processing comprises identifying memory latencies due to data access delays.

7. The method of claim 5, wherein identifying temporary suspensions of instruction stream processing comprises identifying data dependencies causing idle processing cycles.

8. The method of claim 1, further comprising storing one of the addresses of the list into a register of the instruction processor to identify which of the corresponding inactive data blocks is to be cleared.

9. The method of claim 1, further comprising initializing one or more of the inactive data blocks using the instructions of the instruction stream when an initialized inactive data block is required and no available computing cycles can be identified.

10. The method of claim 1, wherein generating a list of addresses comprises generating a queue of the addresses corresponding to the identified inactive data blocks.

11. The method of claim 1, wherein generating a list of addresses comprises generating a linked list of the addresses corresponding to the identified inactive data blocks.

12. The method of claim 1, wherein identifying one or more inactive data blocks in the memory comprises identifying one or more inactive pages in a secondary storage associated with the memory.

13. The method of claim 1, wherein identifying one or more inactive data blocks in the memory comprises identifying one or more inactive cache lines associated with a cache memory.

14. The method of claim 1, wherein identifying one or more inactive data blocks in the memory comprises identifying one or more inactive memory segments, wherein the memory segments comprise a predetermined block size of memory.

15. The method of claim 1, wherein initializing the inactive data blocks comprises clearing a subset of the inactive data block currently being cleared, each time the available computing cycles are identified, until the inactive data block is completely cleared.

16. The method of claim 15, wherein the subset of the inactive data block is a predetermined fixed number of bytes.

17. The method of claim 15, wherein the subset of the inactive data block is a variable number of bytes dependent on a number of the available computing cycles identified.

18. The method of claim 1, wherein initializing the inactive data blocks comprises writing memory locations associated with the inactive data blocks to a logic state of zero.

19. The method of claim 1, wherein initializing the inactive data blocks comprises writing the inactive data blocks to a predetermined data pattern that obscures a pre-clearing state of the inactive data blocks.

20. The method of claim 1, further comprising generating a second list of second addresses corresponding to the inactive data blocks which have been initialized and are available for use by the computing system.

21. The method of claim 20, wherein generating a second list of addresses comprises generating a queue of the second addresses.

22. The method of claim 20, wherein generating a second list of addresses comprises generating a linked list of the second addresses.

23. A method for increasing processing performance in a computer system having at least one instruction processor to process instructions of an instruction stream, and having a memory to store data, the method comprising:

identifying one or more inactive data pages in the memory;

storing a first list of first addresses corresponding to the identified inactive data pages in a first linked list;

identifying idle memory write cycles associated with a data write interface between the instruction processor and the memory;

clearing the one or more inactive data pages associated with the list of addresses to a predetermined state during one or more of the identified idle memory write cycles, wherein the at least one instruction processor that processes instructions of the instruction stream initiates the clearing via the data write interface independent of activity in the instruction stream; and storing a second list of second addresses corresponding to the one or more inactive data pages that have been cleared in a second linked list.

24. The method of claim 23, further comprising passing one of the first addresses to the instruction processor, via the instruction stream, to identify which of the first addresses to be cleared.

25. The method of claim 24, further comprising generating an interrupt, at the instruction processor, upon completion of clearing the first address that was passed to the instruction processor.

26. The method of claim 25, wherein generating an interrupt comprises tagging a page-cleared indication onto an existing interrupt already generated by the processor.

27. The method of claim 23, further comprising retrieving one of the first addresses in the first linked list by the instruction processor.

28. The method of claim 27, further comprising executing an instruction in the instruction stream to notify the instruction processor of an address of the first linked list.

29. The method of claim 27, further comprising directing the instruction processor to store the second address corresponding to the inactive data page that has been cleared onto the second linked list.

30. The method of claim 29, wherein directing the instruction processor to store the second address comprises executing an instruction in the instruction stream to notify the instruction processor of an address of the second linked list.

31. The method of claim 30, wherein clearing the one or more inactive data pages associated with the list of addresses to a predetermined state comprises zeroing the inactive data pages by writing memory locations associated with the inactive data pages to a logic state of zero.

32. A system for asynchronously initializing inactive data blocks in a computing system, comprising:

a memory for storing instructions and data associated with an instruction stream, wherein the memory includes inactive data blocks currently unused by the computing system and having residual data therein;

a first queue to store one or more addresses corresponding to the inactive data blocks;

a second queue to store one or more addresses corresponding to the inactive data blocks that have been initialized; and at least one instruction processor to process instructions of the instruction stream, the at least one instruction processor including a write interface coupled to the memory to allow data to be written to the memory, wherein the at least one instruction processor is configured and arranged to accept the addresses from the first queue, initialize the corresponding inactive data blocks via the write interface during idle memory write cycles between the at least one instruction processor and the memory, and to store the addresses corresponding to the inactive data blocks that have been initialized onto the second queue.

33. The system as in claim 32, wherein the instruction processor is configured and arranged to initialize the corresponding inactive data blocks via the write interface by transmitting a predetermined data pattern to the inactive data blocks from the instruction processor to the memory via the write interface during the idle memory write cycles.

34. The system as in claim 33, wherein the instruction processor is further configured and arranged to asynchronously transmit the predetermined data pattern via the write interface to overwrite the residual data of the inactive data blocks, independent of activity in the instruction stream.

35. The system as in claim 33, wherein the instruction processor is further configured and arranged to asynchronously transmit the predetermined data pattern by writing memory locations associated with the inactive data blocks to a logic state of zero.

36. The system as in claim 32, wherein the instruction processor includes a first level cache memory, and wherein the memory is a second level cache memory coupled to receive data from the first level cache memory via the write interface.

37. A system for asynchronously initializing inactive data blocks in a computing system, comprising:

a memory for storing instructions and data associated with an instruction stream, wherein the memory includes inactive data blocks currently unused by the computing system and having residual data therein, and wherein the memory further includes a first linked list to store one or more addresses corresponding to the inactive data blocks and a second linked list to store one or more addresses corresponding to the inactive data blocks that have been initialized; and at least one instruction processor to process instructions of the instruction stream, the at least one instruction processor including a write interface coupled to the memory to allow data to be written to the memory, wherein the at least one instruction processor is configured and arranged to accept the addresses from the first linked list, initialize the corresponding inactive data blocks via the write interface during idle memory write cycles between the at least one instruction processor and the memory, and to store the addresses corresponding to the inactive data blocks that have been initialized onto the second linked list.

* * * * *